United States Patent [19]

Yamada

[11] Patent Number: 5,253,336
[45] Date of Patent: Oct. 12, 1993

[54] METHOD FOR FITTING THIRD-DEGREE BEZIER CURVES TO SERIES OF DATA POINTS

[75] Inventor: Keiichi Yamada, Oome, Japan

[73] Assignee: Kabushiki Kaisha Toshiba, Kawasaki, Japan

[21] Appl. No.: 511,727

[22] Filed: Apr. 20, 1990

[30] Foreign Application Priority Data

Apr. 20, 1989 [JP] Japan ................... 1-100536

[51] Int. Cl.$^5$ ............................ G06F 15/62
[52] U.S. Cl. ....................... 395/142; 395/141;
382/46; 345/136; 345/135
[58] Field of Search ............... 364/518, 521, 522;
340/747, 750, 728; 382/46; 395/141, 142, 143

[56] References Cited

U.S. PATENT DOCUMENTS

| | | | |
|---|---|---|---|
| 4,686,634 | 8/1987 | Schrieber | 364/523 |
| 4,943,935 | 7/1990 | Sato | 364/518 |
| 4,958,272 | 9/1990 | Wake | 366/518 |
| 4,998,664 | 3/1991 | Gibson et al. | 228/102 |

OTHER PUBLICATIONS

Computer Aided Geometric Design, 1, (1984) Jan. 1960, "A Survey of Curve and Surface Methods in DAGD", by W. Bohm et al., pp. 12-13.
Graphics Interface '85, pp. 337–341, "Geometric Continuity with Interpolating Bezier Curves", A. Fournier et al., 1985.
Computer Graphics, vol. 17, No. 13, Jul. 1983, pp. 229–239, "Curve-Fitting with Piecewise Parametric Cubics", M. Plass et al., (Xerox Palo Alto).
"A Method for Detecting Corner Points of a Fine-Lined Image", by Koyama et al., The Institute of Electronics and Communication Engineers Technical Report PRL 80-107 (1980).

Primary Examiner—Phu K. Nguyen
Attorney, Agent, or Firm—Cushman, Darby & Cushman

[57] ABSTRACT

In curve fitting with respect to a series of data points representing a figure, control points are set for a parameter in accordance with a start point, an end point, and a passing point, and gradients of the respective points. A gradient of a Bezier curve specified on the basis of the start and end points and the control points is obtained for the parameter. If a difference value between the gradient of the Bezier curve and the gradient of the passing point is within a desired value, the curve specified by the start and end points and the control points for the parameter is determined to be a Bezier curve passing the passing point.

6 Claims, 6 Drawing Sheets

METHOD FOR FITTING THIRD-DEGREE BEZIER CURVES TO SERIES OF DATA POINTS

BACKGROUND OF THE INVENTION

1. Field of the Invention

The present invention relates to a method for fitting third-degree Bezier curves to a series of data points. 2. Description of the Related Art In the field of computer graphics, CAD (Computer Aided Design), outline font creation and the like, a third-degree Bezier curve P(t) represented by the following equation is used to express a contour of a character or a curve of a graphic pattern or the like:

$$P(t)=(1-t)^3 Q0+3(1-t)^2 tQ1+3(1-t)t^2 Q2+t^3 Q3 \quad (0 \leq t \leq 1) \quad (1)$$

where Q0 to Q3 are parameters (position vectors) for determining a figure and are also called control points. Note that Q0 and Q3 are start and end points, respectively, of the curve P(t) for $0 \leq t \leq 1$.

In a technique for expressing a contour of a character or a graphic pattern by using a third-degree Bezier curve, for example, curve fitting to an original figure of a graphic pattern expressd in the form of a bit map is performed.

In this method, one Bezier curve is normally fitted on two points of start and end points Q0 and Q3 of a series of data points. A method for fitting a curve by using a Bezier curve is described in, e.g., Wolfgang BOHM, "A survey of curve and surface methods in CAGD", PP. 1 to 60, Computer Aided Geometric Design 1, 1984.

In this manner, in conventional curve fitting using a third-degree Bezier curve, two points are fitted by one curve. Therefore, if the number of fitting points is large, the number of control points Q0 to Q3 representing a Bezier curve is increased, thereby increasing the data amount to be processed.

Therefore, a method of fitting a third-degree Bezier curve on three or more points is needed.

SUMMARY OF THE INVENTION

It is an object of the present invention to provide a method for fitting third-degree Bezier curves to a series of data points.

According to the present invention, there is provided a method for fitting third-degree Bezier curves to a series of data points, the method comprising the steps of:

setting parameters representing a curve segment having a passing point;

calculating two control parameters for representing the third-degree Bezier curve from the set parameters;

calculating a gradient of the third-degree Bezier curve from the set parameters and the calculated two control parameters;

comparing the calculated gradient with a gradient of the passing point;

determining a fitting degree in accordance with a comparison result; and fitting the third-degree Bezier curve to the curve segment in accordance with a determination result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENT

An embodiment of the present invention will be described below with reference to the accompanying drawings.

Figure 1:
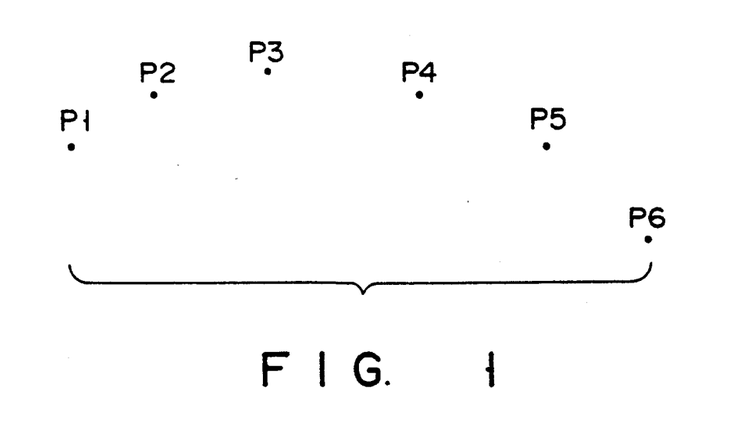
FIG. 1 is a view showing a series of data points.

When a series P1, P2, ..., Pi, ..., Pn of data points is given as shown in FIG. 1, for example, a tangent direction at point Pi is set to be Pi+1−Pi-1.

Figure 2:
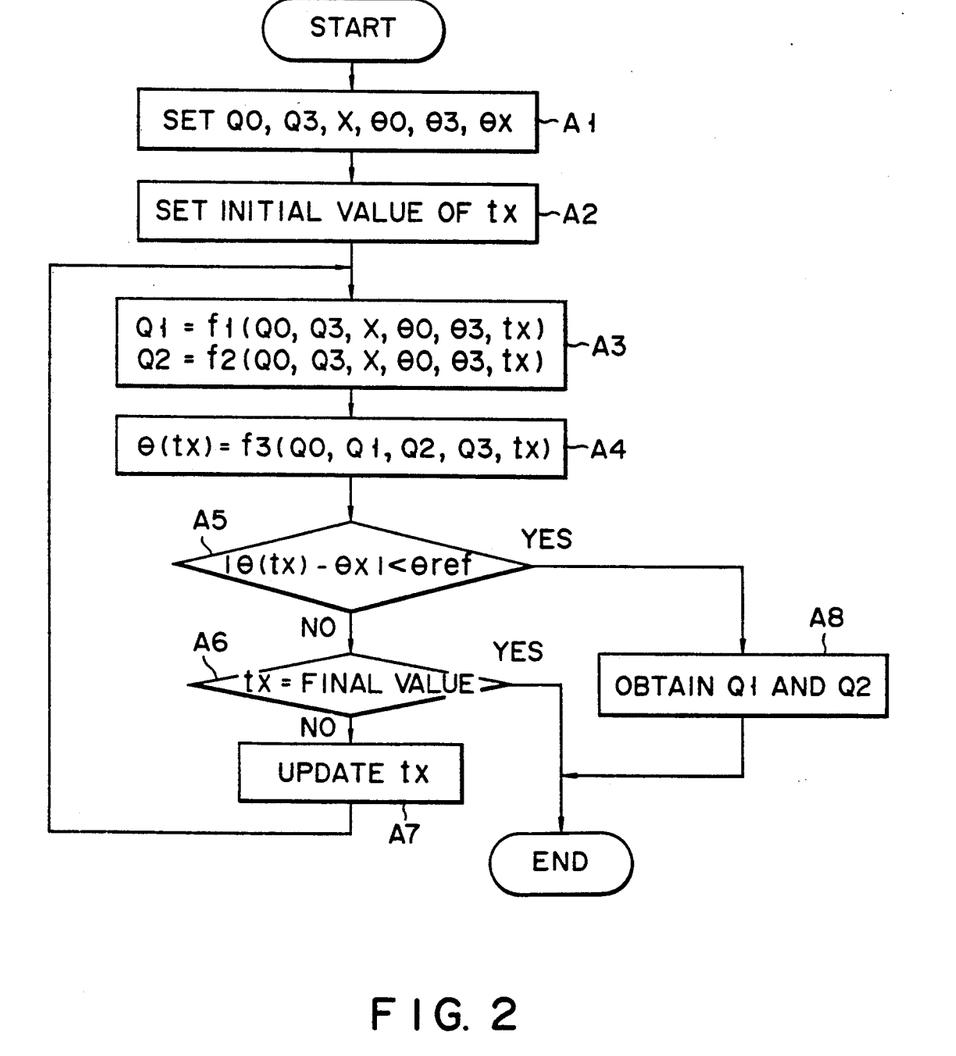
FIG. 2 is a flow chart of a three-point curve fitting process according to an embodiment of the present invention.

In a case of fitting Bezier curves to three points, a curve fitting process of this embodiment will be described below with reference to a flow chart shown in FIG. 2.

Figure 3:
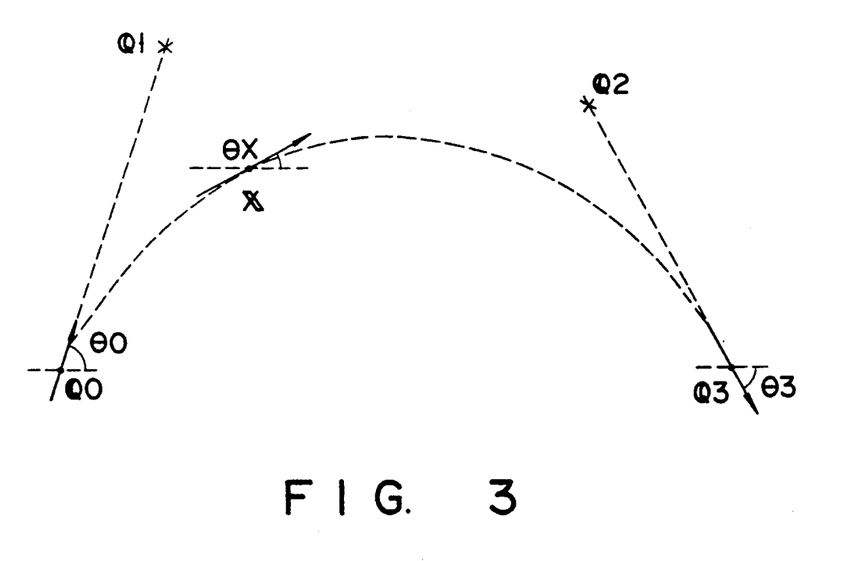
FIG. 3 is a view for explaining the three-point curve fitting process.

When data points to be fitted are P1, P2 and P3, as shown in FIG. 3, in step A1, P1, P2 and P3 are set as a start point Q0, a passing point X, and an end point Q3, respectively, and Q0, X and Q3 are set as gradients $\theta 0$, $\theta x$ and $\theta 3$, respectively points.

In step A2, an initial value of a parameter tx is set to be, e.g., 0.2.

In step A3, control points Q1 and Q2 shown in FIG. 3 are obtained on the basis of the parameter tx, the points Q0, Q3, and X, and the gradients $\theta 0$ and $\theta 3$.

If the points Q1 and Q2 are control points of a curve segment having the gradient $\theta 0$ at the point Q and the gradient $\theta 3$ at the point Q3, the points Q1 and Q2 are present on straight lines passing the points Q0 and Q3 and having the gradients $\theta 0$ and $\theta 3$, respectively. Therefore, the control points Q1 and Q2 are set by calculating $|Q1-Q0|$ and $|Q2-Q3|$. Note that $|Q1-Q0|$ and $|Q2-Q3|$ are calculated by the following equations:

$$|Q1 - Q0| = Xy \cos\theta 2 - Xx \sin\theta 2 + (A0 + A1) \\ (Q0x \sin\theta 0 - Q0y \cos\theta 0) + (A2 + A3) \\ (Q3x \sin\theta 0 - Q3y \cos\theta 0)/ \\ \{(A1(\cos\theta 3 \sin\theta 0 - \sin\theta 3 \cos\theta 0)\} \quad (2)$$

$$|Q2 - Q3| = Xy \cos\theta 0 - Xx \sin\theta 0 + (A0 + A1) \\ (Q0x \sin\theta 0 - Q0y \cos\theta 0) + (A2 + A3) \\ (Q3x \sin\theta 0 - Q3y \cos\theta 0)/ \\ \{A2(\cos\theta 3 \sin\theta 0 - \sin\theta 3 \cos\theta 0)\} \quad (3)$$

where for $A0=(1-tx)^3$, $A1=3(1-tx)^2 tx$, $A2=3(1-tx)tx^2$, and $A3=tx^3$. Note that Qnx and Qny (n=0 to 3) are vector components of Qn in the X and Y directions, respectively, at each of the control points, the start point, and the end point.

Therefore, Q1 and Q2 are represented by the following equations:

$$Q1 = f1 = Q0 + |Q1 - Q0| \cdot n0 \quad (4)$$

$$Q2 = Q3 - |Q2 - Q3| \cdot n3 \quad (5)$$

where n0 is the unit vector having the gradient $\theta 0$ and n3 is the unit vector having the gradient $\theta 2$.

In step A4, a gradient $\theta(tx)$ for $t = tx$ ($=0.2$) of the third-degree Bezier curve P(t) is obtained on the basis of the control points Q1 and Q2, the start point Q0, and the end point Q3. The gradient $\theta(tx)$ is obtained by the following equation:

$$\begin{aligned}\theta(tx) &= f3 = \tan^{-1}(\beta/\alpha) \quad (6)\\\text{where}\\\alpha &= dPx(t)/dt\\&= -3(1-t)^2 Q0x + 3(1-t)(1-3t)Q1x +\\&\quad 3(2-3t)t\, Q2x + 3t^2 Q3x\\\beta &= dPy(t)/dt\\&= -3(1-t)^2 Q0y + 3(1-t)(1-3t)Q1y +\\&\quad 3(2-3t)t\, Q2y + 3t^2 Q3y\end{aligned}$$

where Px(t) and Py(t) are the vector components in the X and Y directions, respectively, at a point P(t) on the Bezier curve.

In step A5, an absolute value ($|\theta(tx) - \theta x|$) of a difference between $\theta(tx)$ and the gradient $\theta x$ at the passing point X is compared with a reference value $\theta$ref. That is, whether or not $|\theta(tx) - \theta x| < \theta$ref is checked. Note that the reference value $\theta$ref is a value representing an allowable error of the gradient at the passing point X upon curve fitting.

If $|\theta(tx) - \theta x| < \theta$ref in step A5, the set control points Q1 and Q2 are obtained as control points of the third-degree Bezier curve segment passing Q0, X, and Q3 (step A8).

If $|\theta(tx) - \theta x| < \theta$ref in step A5, the set control points Q1 and Q2 are determined not to be control points of the third-degree Bezier curve segment passing Q0, X, and Q3.

In step A6, whether or not tx reaches a final value (e.g., 0.8) is checked. If tx does not reach the final value in step A6, the value of tx is updated (step A7), and the process in step A3 is performed.

Updating of tx is performed by sequentially adding $\Delta tx$ (e.g., 0.05) to tx. The process in each of steps A3 and A4 is repeated until $|\theta(tx) - \theta x| < \theta$ref in step A5 or tx reaches the final value in step A6.

In this embodiment, the initial value ($=0.2$) and the final value ($=0.8$) of tx are fixed values. In order to reduce a calculation time, however, the initial and final values of tx can be set by the following equations:

$$\text{initial value} = |X - Q0|/(|Q3 - X| + |X - Q0|) - C \quad (7)$$

$$\text{final value} = X - Q0/(Q3 - X + X - Q0) + C \quad (8)$$

where C is a constant set to be, e.g., 0.2. If the initial value is 0 or less, 0 is set as the initial value. If the final value exceeds 1, 1 is set as the final value.

If $|\theta(tx) - \theta x| \geq \theta$ref in step A5 and tx is the final value in step A6, it is determined that no third-degree Bezier curve segment can be obtained on the basis of the start, end, and passing points Q0, Q3, and X and the gradients $\theta 0$, $\theta 3$, and $\theta x$ of the respective points.

As described above, fitting of a third-degree Bezier curve can be performed by obtaining the control points Q1 and Q2 on the basis of the points Q0, Q3, and X and the gradients $\theta 0$, $\theta 3$, and $\theta x$ of the respective points.

The process of fitting a third-degree Bezier curve on four or more points will be described below with reference to flow charts shown in FIGS. 4A, 4B and 4C. Curve fitting is performed where a distance between the third-degree Bezier curve segment and each point is within a predetermined distance range. In this process, curve fitting to five points P1, P2, P3, P4 and P5 is performed. In step B0, as shown in FIG. 5, points P1, P2, P3, P4 and P5 are set as a start point Q0, passing points X1, X2, and X3, and an end point Q3, respectively, and gradients $\theta 0$, $\theta 3$, $\theta x1$, $\theta x2$, and $\theta x3$ are set to the respective points.

Figure 4A:
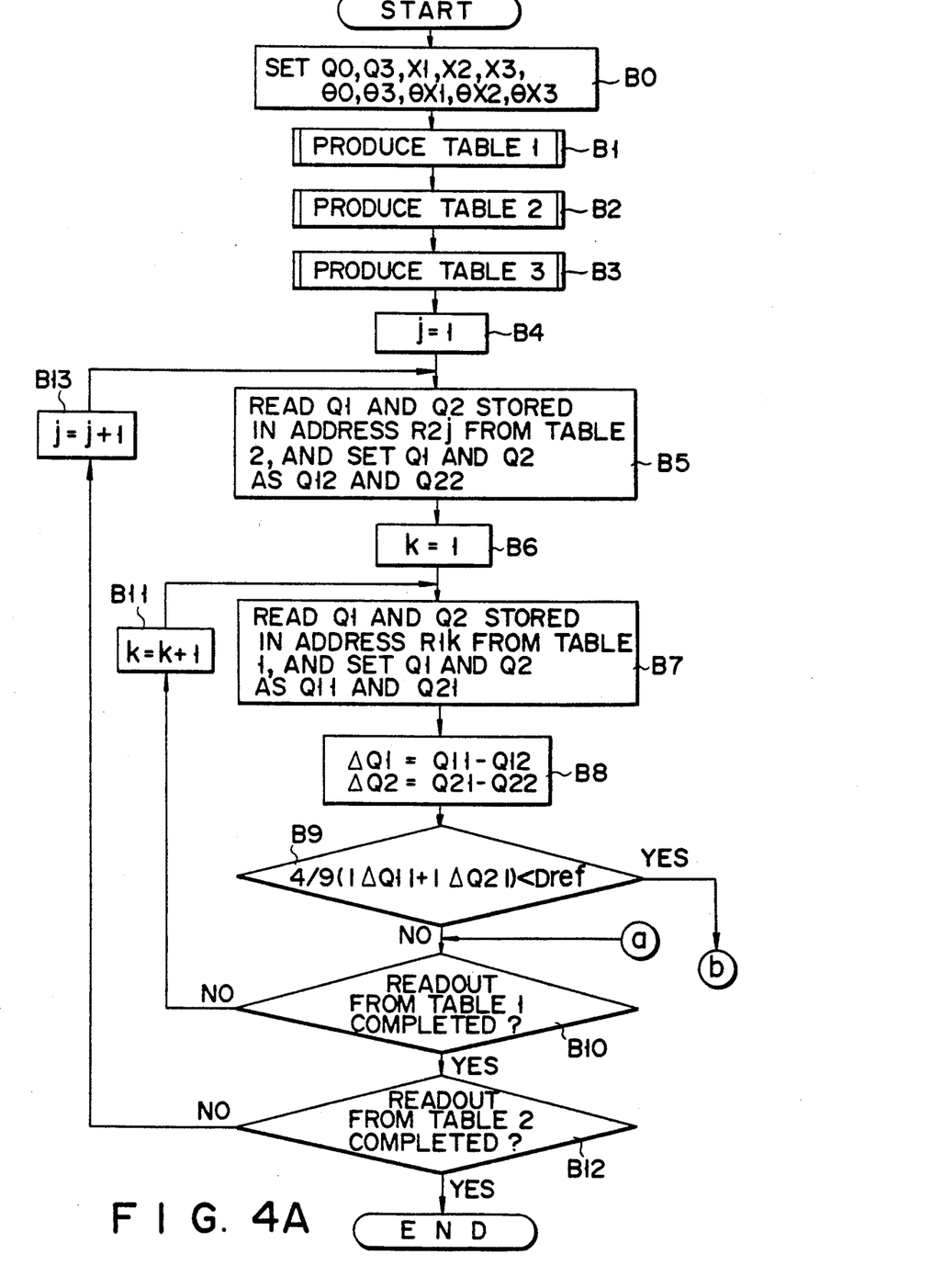
FIGS. 4A, 4B and 4C are flow charts of a five-point curve fitting process.
Figure 4B:
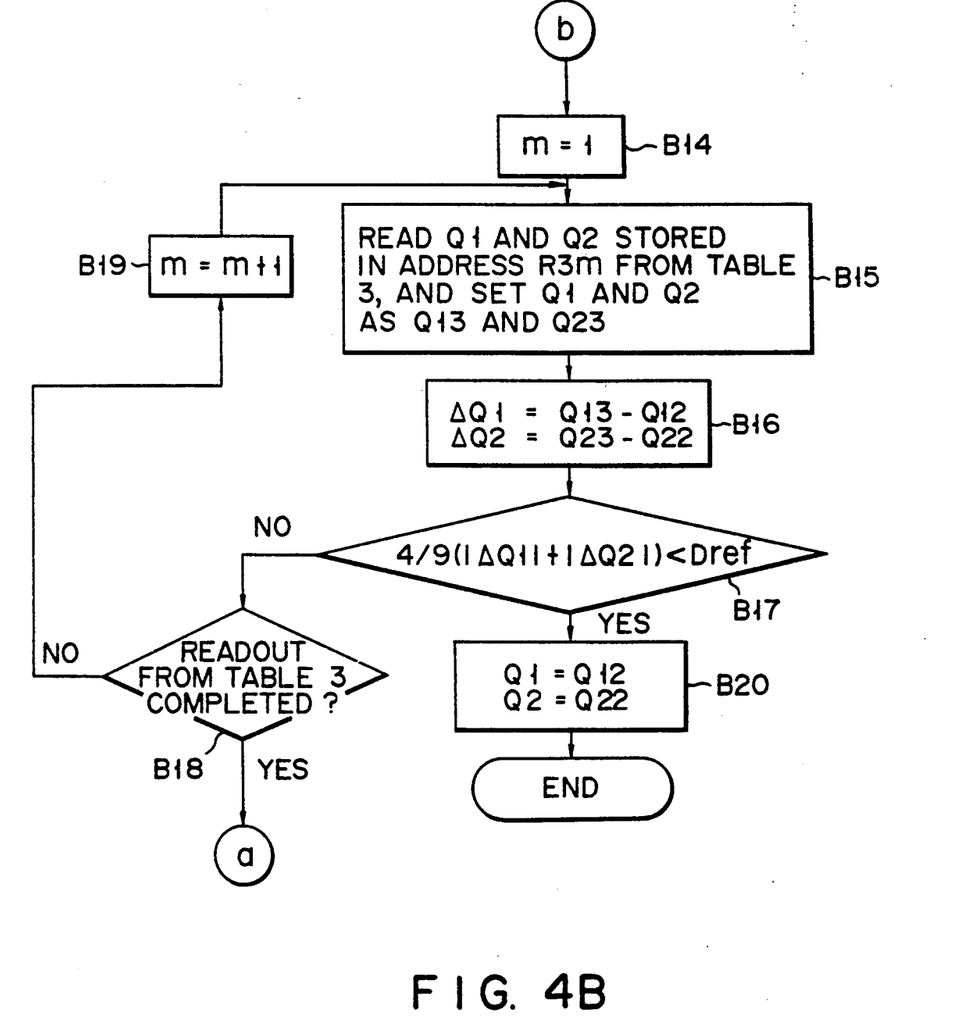
Figure 4C:
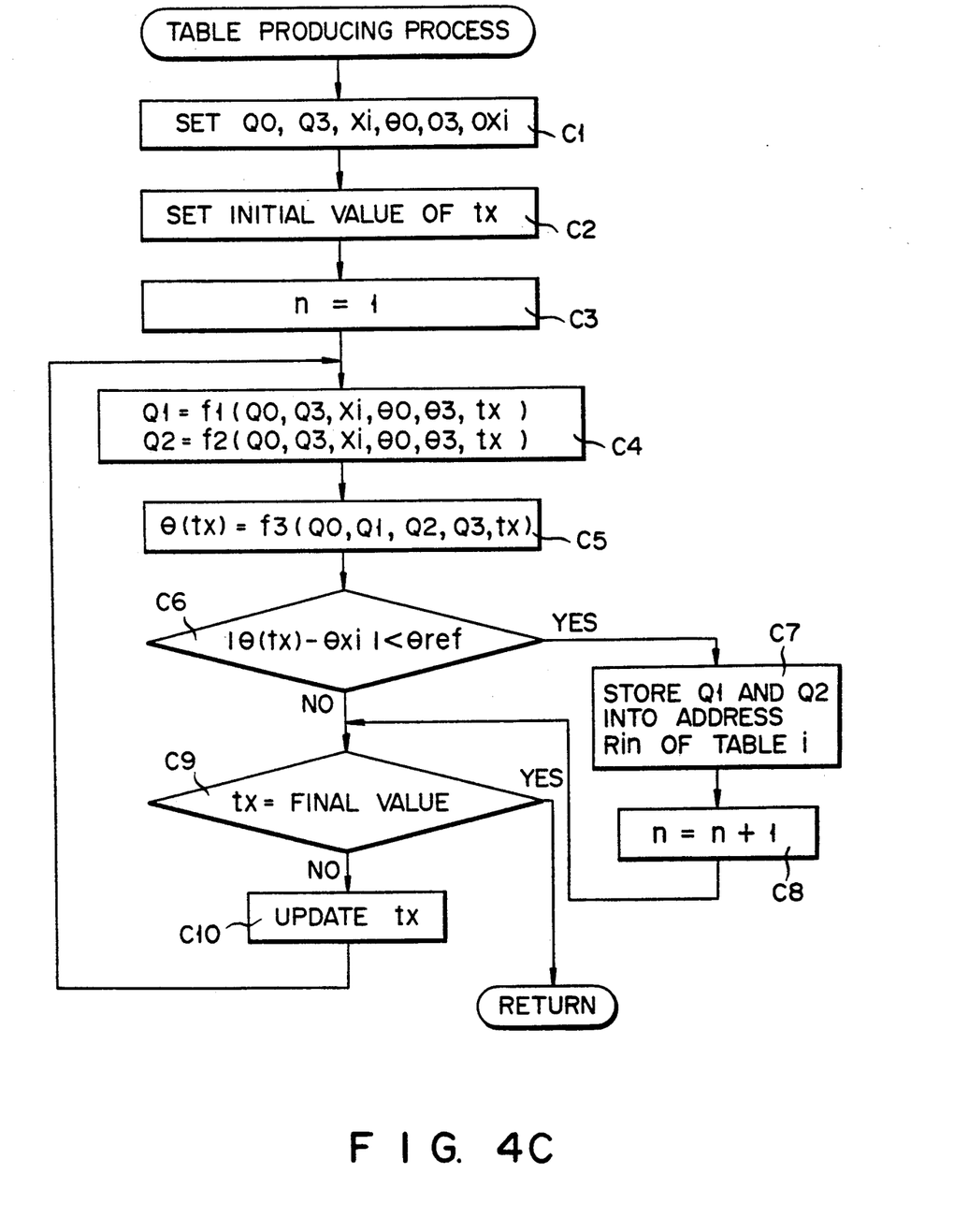
Figure 5:
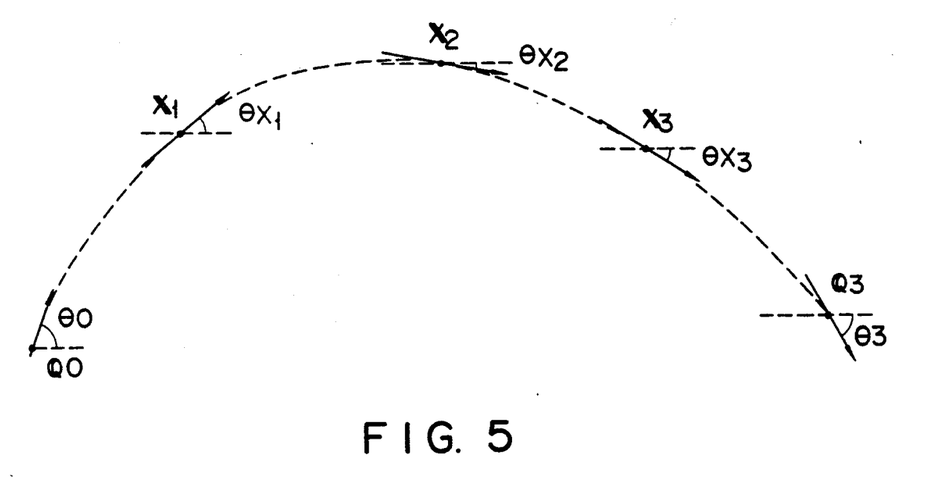
FIG. 5 is a view for explaining the five-point curve fitting process.
Figure 6A:
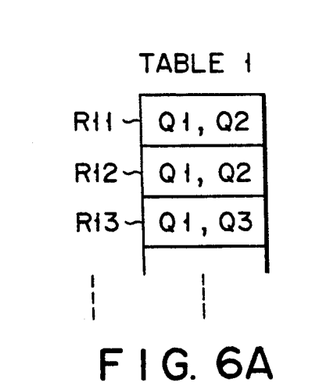
FIGS. 6A, 6B and 6C are views each showing a format of a table produced in the process shown in FIG. 4C.
Figure 6B:
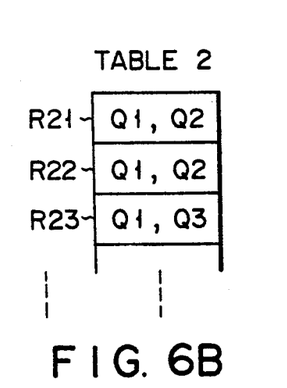
Figure 6C:
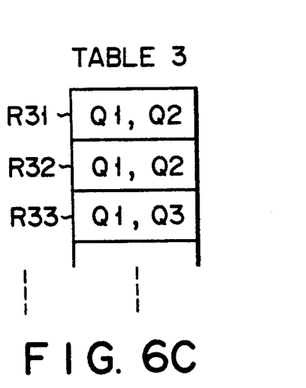

When the points Q0, Q3, X1, X2, and X3 and the gradients $\theta 0$, $\theta 3$, $\theta x1$, $\theta x2$, and $\theta x3$ are given, Tables 1, 2, and 3 as shown in FIGS. 6A, 6B, and 6C, respectively, are produced in accordance with the flow chart shown in FIG. 4A (steps B1 to B3).

The table production process will be described below in accordance with the flow chart shown in FIG. 4C.

In step C1, Q0, Q3, Xi, $\theta 0$, $\theta 3$, and $\theta xi$ ($i = 1$ to 3) are set.

In step C2, an initial value of tx is set.

In step C3, $n = 1$ is set.

In step C4, control points Q1 and Q2 are obtained on the basis of tx, Q0, Q3, Xi, $\theta 0$, and $\theta 3$.

In step C5, a gradient $\theta(tx)$ of a third-degree Bezier curve is obtained on the basis of Q0, Q3, Q1, Q2, and tx.

In step C6, whether or not $|\theta(tx) - \theta x| < \theta$ref is checked.

If $|\theta(tx) - \theta x| < \theta$ref in step C6, Q1 and Q2 are stored in a Table i (step C7). The contents of an nth address stored in Table i are referred using an address Rin. In step C8, the value of n is incremented by 1.

If $|\theta(tx) - \theta x| < \theta$ref in step C6 or the process in step C8 is completed, it is checked in step C9 whether or not tx is a final value.

If tx is not the final value in step C9, tx is updated (step C10), and the process in step C4 is performed.

If tx is the final value in step C9, it is determined that no third-degree Bezier curve segment can be obtained on the basis of start, end, and passing points Q0, Q3, and Xi, respectively, and the gradients $\theta 80$, $\theta 3$, and $\theta x$ of the respective points.

In this embodiment, if the control points Q1 and Q2 representing a third-degree Bezier curve segment cannot be obtained on the basis of (Q0, Q3, X1), (Q0, Q3, X2), or (Q0, Q3, X3) in step B1, B2, or B3, respectively, it is determined that no curve segment which can be fitted can be obtained.

In step B4, $j = 1$ is set.

In step B5, Q1 and Q2 stored in an address R2j of Table 2 are read out and set as Q12 and Q22, respectively.

In step B6, $k = 1$ is set.

In step B7, Q1 and Q2 stored in an address R1k of Table 1 are read out and set as Q11 and Q21, respectively.

In step B8, $\Delta Q1$ (Q11 − Q12) and $\Delta Q2$ (Q21 − Q22) are obtained on the basis of the control points Q11 and Q21 set in step B7 and the control points Q12 and Q22 set in step B5.

If two curve segments having the same start and end points Q0 and Q3 and different passing points X1 and X2 are present and control points Q1 and Q2 corresponding to the respective curve segments are shifted by small distances ΔQ1 and ΔQ2, respectively, a shift ΔP(t) between Bezier curves P(t) is represented by the following equation:

$$\Delta P(t) = (\partial P/\partial Q1) \cdot \Delta Q1 + (\partial P/\partial Q2) \cdot \Delta Q2 \quad (9)$$

Therefore, if the shift P(t) between the two Bezier curves P(t) and a reference distance error Dref representing an allowable error of the shift satisfy $|\Delta P(t)| < $Dref, the two curve segments can be represented by one common curve segment.

In addition, instead of the determination of $|\Delta P(t)| < $Dref, the determination of $4/9 \cdot (|\Delta Q1| + |\Delta Q2|) < $Dref can be used. The reason is as follows. That is, in accordance with the definition of a Bezier curve, the following equations are obtained:

$$\partial P/\partial Q1 = 3(1-t)^2 t \quad (10)$$

$$\partial P/\partial Q2 = 3(1-t)t^2 \quad (11)$$

Note that since a Bezier curve segment is defined by a value of t ($0 < t < 1$), values of $\partial P/\partial Q1$ and $\partial P/\partial Q2$ are 0 to 4/9. Therefore, the following equation is obtained:

$$|\Delta P(t)| < 4/9 \cdot (|\Delta Q1| + |\Delta Q2|) \quad (12)$$

That is, if $4/9 \cdot (|\Delta Q1| + |\Delta Q2|) < $Dref, $|\Delta P(t)| < $Dref is obtained.

In step B9, whether or not $4/9 \cdot (|\Delta Q1| + |\Delta Q2|) < $Dref is checked. That is, on the basis of a curve segment passing the passing point X1 and a curve segment passing the passing point X2, it is checked whether or not a curve segment which can be fitted on (Q0, Q3, X1, X2) is present.

If $4/9 \cdot (|\Delta Q1| + |\Delta Q2|) < $Dref in step B9, it is checked in step B10 whether or not data readout from Table 1 is completed.

If a readout of data stored in Table 1 is not completed in step B10, the value of k is incremented by +1 (step B11), and new Q11 and Q21 are set in step B7. That is, a readout address R1k in Table 1 is incremented, and Q1 and Q2 specified by the incremented readout address R1k are read out.

If a readout of the data stored in Table 1 is completed in step B10, it is checked in step B12 whether or not readout of data stored in Table 2 is completed.

If a readout of the data stored in Table 2 is not completed in step B12, the value of j is incremented by +1 (step B13), and new Q12 and Q22 are set in step B5. That is, a readout address R2j in Table 2 is incremented, and Q1 and Q2 specified by the incremented readout address R2j are read out.

If $4/9 \cdot (|\Delta Q1| + |\Delta Q2|) < $Dref in step B9, m = 1 is set in step B14.

In step B15, Q1 and Q2 stored in an address R3m of Table 3 are read out and set as Q13 and Q23, respectively.

In step B16, ΔQ1 and ΔQ2 are obtained on the basis of the control points Q13 and Q23 set in step B15 and the control points Q12 and Q22 set in step B5.

In step B17, whether or not $4/9 \cdot (|\Delta Q1| + |\Delta Q2|) < $Dref is checked on the basis of ΔQ1 and ΔQ2 obtained in step B16. That is, it is checked whether or not a curve segment which can be fitted on five points (Q0, Q3, X1, X2, and X3) is present.

If $4/9 \cdot (|\Delta Q1| + |\Delta Q2|) < $Dref in step B17, it is checked whether or not readout of data from Table 3 is completed in step B18.

If a readout of the data stored in Table 3 is not completed in step B18, the value of m is incremented by +1 (step B19), and new Q13 and Q23 are set in step B15. That is, the readout address R3m in Table 3 is incremented, and Q1 and Q2 specified by the incremented readout address R3m are read out.

If a readout of the data from Table 3 is completed in step B18, the process in step B10 is performed.

If $4/9 \cdot (|\Delta Q1| + |\Delta Q2|) < $Dref in step B17, it is determined that a third-degree Bezier curve segment is obtained on the basis of the start and end points Q1 and Q3, the passing points X1, X2, and X3, and the gradients θ1, θ2, θx1, θx2, and θx3 of the respective points, and Q12 and Q22 are set as control points Q1 and Q2 representing the third-degree Bezier curve segment. Note that the control points Q1 and Q2 can be set as an average value of Q11, Q12, and Q13 and that of Q21, Q22, and Q23, respectively.

The method of fitting a Bezier curve on five points has been described above. In the present invention, however, a curve segment can be fitted on six or more points. In this case, the number of determination process steps is increased in accordance with the number of passing points.

In the above embodiment, the curve fitting process is performed on the basis of the passing point X2. The fitting process, however, can be performed while the number of passing points is sequentially increased. By this process, a larger number of curve segments can be fitted by one third-degree Bezier curve.

According to the present invention, since three or more points can be fitted by the third-degree Bezier curve segment, the number of control points Q0 to Q3 representing a third-degree curve segment can be reduced. Therefore, an amount of data to be processed can be reduced.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A method of generating and displaying a curved image, comprising the steps of:
    receiving a curve segment of an image in the form of a series of data points;
    fitting a third-degree Bezier curve to said series of data points; and
    thereby generating a curved image in the form of said third-degree Benzier curve;
    wherein said third-degree Bezier curve fitting step includes the steps of:
    setting parameters representing said curve segment, one parameter being a passing point, said passing point being a data point in the middle of said series of data points;
    calculating two control parameters, for representing said third-degree Bezier curve, from said set parameters;

calculating a gradient of said third-degree Bezier curve from said set parameters and said calculated two control parameters;
setting a gradient of said passing point;
comparing said calculated gradient with said set gradient of said passing point;
thereby determining whether or not said two control parameters represent said third-degree Bezier curve for said data points; and
fitting said third-degree Bezier curve to said data points when it is determined that said two control parameters represent said third-degree Bezier curve.

2. The method according to claim 1, wherein said set parameters represent a start point, said passing point, an end point and their respective gradients.

3. The method according to claim 1, wherein said determining step includes the step of obtaining said two control parameters as control parameters of said third-degree Bezier curve when a difference between said calculated gradient and said gradient of said passing point is smaller than a desired reference gradient.

4. A method for generating and displaying a curved image comprising the steps of:
receiving a curve segment of an image in the form of a series of data points;
fitting a third-degree Bezier curve to said series of data points; and
thereby generating a curved image in the form of said third-degree Bezier curve;
wherein said third-degree Bezier curve fitting step includes the steps of:
setting parameters representing said curve segment, said parameters having a plurality of passing points, said passing points being data points in the middle of said series of data points, said parameters including at least two pairs of first control parameters representing said third-degree Bezier curve;
calculating at least two pairs of second control parameters, for representing said third-degree Bezier curve, from said set parameters;
calculating a plurality of gradients of said third-degree Bezier curve from said set parameters and said calculated second control parameters;
setting gradients of said plurality of passing points;
comparing said calculated gradients with said set gradients of said passing points;
thereby determining first, whether or not said second control parameters representing said Bezier curve may be fitted to each of said passing points;
calculating at least two pairs of distances between said first control parameters and said second control parameters for each of said passing points from said set parameters and said calculated second control parameters in accordance with said first determination step;
comparing said calculated distances with a desired reference distance;
thereby determining second, whether or not said third-degree Bezier curve may be fitted to at least two passing points; and
fitting said third-degree Bezier curve to said data points when it is determined that said third-degree Bezier curve may be fitted to at least two passing points.

5. The method according to claim 4, wherein said set parameters represent a start point, said passing points, an end point and respective said gradients in the curve segment.

6. The method according to claim 4, wherein said step of determining second, whether or not to fit a third-degree Bezier curve to at least two passing points includes the step of obtaining said second control parameters as control parameters of said third-degree Bezier curve for at least two passing points when a summation of said calculated distances is smaller than said desired reference distance.

* * * * *